United States Patent [19]

Reuter et al.

[11] Patent Number: 4,781,362
[45] Date of Patent: Nov. 1, 1988

[54] HYDRAULICALLY DAMPING ELASTIC BEARING

[75] Inventors: Horst Reuter, Wachtberg-Oberbachem; Jörn-Rainer Quast, Sinzig-Bad Bodendorf; Heinz Brenner, Ahrweiler; Peter Maier, Wachtberg-Fritzdorf; Heinrich Meyer, Königswinter, all of Fed. Rep. of Germany

[73] Assignee: BOGE GmbH, Eitorf, Fed. Rep. of Germany

[21] Appl. No.: 74,932

[22] Filed: Jul. 17, 1987

Related U.S. Application Data

[63] Continuation-in-part of Ser. No. 851,879, Apr. 11, 1986, Pat. No. 4,697,794, and Ser. No. 821,173, Jan. 19, 1986, Pat. No. 4,697,796.

[30] Foreign Application Priority Data

Sep. 26, 1986 [DE] Fed. Rep. of Germany ....... 3632670

[51] Int. Cl.⁴ ............ B60G 13/00; F16F 15/04; F16M 13/00; B62D 21/00
[52] U.S. Cl. .................... 267/219; 180/312; 248/562; 248/636; 267/140.1
[58] Field of Search ............ 267/35, 140.1, 152, 267/153, 217, 219, 256, 257, 258, 292, 220; 188/298; 180/300, 312; 123/192 R, 195 A; 248/562, 636, 659; 137/493, 843, 849, 859; 251/120, 126; 92/96, 98 R, 103 R, 103 SD

[56] References Cited

U.S. PATENT DOCUMENTS

| | | | |
|---|---|---|---|
| 3,739,936 | 6/1973 | Jones, Jr. | 137/849 X |
| 4,638,981 | 1/1987 | Sciortino | 267/140.1 |
| 4,666,137 | 5/1987 | Hamaekers et al. | 267/140.1 |
| 4,697,793 | 10/1987 | Reuter et al. | 267/140.1 X |

FOREIGN PATENT DOCUMENTS

| | | | |
|---|---|---|---|
| 0098331 | 1/1984 | European Pat. Off. | |
| 0098330 | 1/1986 | European Pat. Off. | |
| 3246587 | 6/1984 | Fed. Rep. of Germany | |
| 3246205 | 6/1984 | Fed. Rep. of Germany | |
| 3416431 | 11/1985 | Fed. Rep. of Germany | |
| 3501628 | 1/1986 | Fed. Rep. of Germany | |
| 3225701 | 3/1986 | Fed. Rep. of Germany | |
| 0884608 | 12/1961 | United Kingdom | 137/859 |

Primary Examiner—Andres Kashnikow
Assistant Examiner—Robert J. Oberleitner
Attorney, Agent, or Firm—Nils H. Ljungman

[57] ABSTRACT

Hydraulically damping elastic bearing with two rigid end walls opposite one another in the axial direction, and at least two chambers located one behind the other and containing damping fluid, at least one of which has a circumferential wall designed as an elastic spring element, whereby the chambers are separated from one another by a partition which is at least partly elastic exhibiting slits for an exchange of fluids. The elastic partition should thereby be designed so that when there is flow against the membrane from different chambers at the same pressure, a different pressure reduction is possible. For this purpose, the elastic partition is asymmetrical in cross section in relation to its center line, at least in the area of the slits, so that the opposite surfaces of the elastic partition are at different distances from the center plane in the area of a slit.

18 Claims, 2 Drawing Sheets

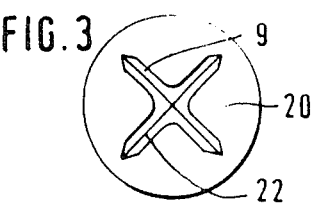
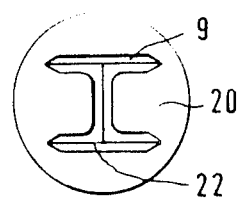
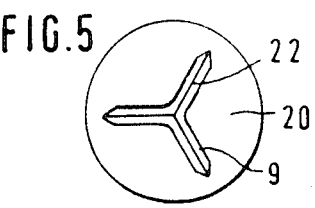
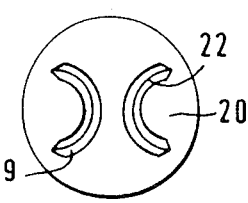
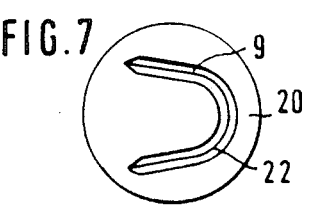
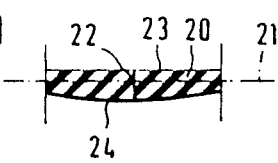
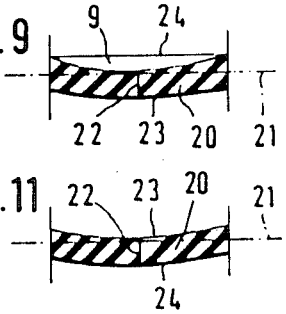
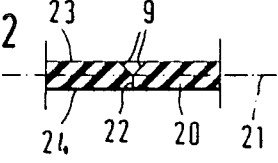
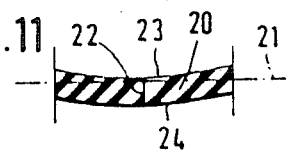
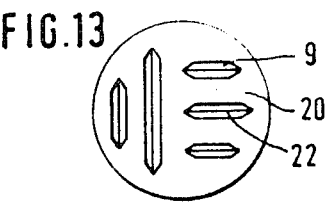
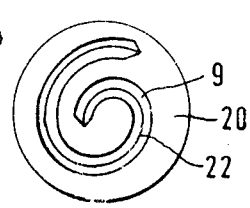

HYDRAULICALLY DAMPING ELASTIC BEARING

This application is a continuation-in-part of application Ser. No. 851,879, filed on Apr. 11, 1986, "Rubber Mounting with Hydraulic Damping", now U.S. Pat. No. 4,697,794 which corresponds to Federal Republic of Germany Patent Application No. P 34 46 587.4, filed on Dec. 16, 1982, and Ser. No. 821,173, filed on Jan. 19, 1986, entitled "Hydraulically Damped Elastic Engine Mount", now U.S. Pat. No. 4,697,796 which corresponds to Federal Republic of Germany Patent Application No. P 35 01 628.0-12, filed on Jan. 19, 1985.

CROSS REFERENCE TO CO-PENDING APPLICATION

Co-pending application Ser. No. 833,962, filed Feb. 27, 1986, now U.S. Pat. No. 4,660,813, entitled "Rubber Mounting with Hydraulic Damping, Particularly for Mounting Vehicle Engines", corresponding to Federal Republic of Germany Patent Application No. P 32 46 205.0-12, filed on Dec. 14, 1984, is assigned to the same assignee as the instant application.

BACKGROUND OF THE INVENTION

1. Field of the Invention

This invention relates to a hydraulically damping elastic bearing, in particular a motor bearing for motor vehicles with two rigid end walls opposite one another in the axial direction and at least two chambers located one behind the other and containing damping fluid, at least one of which has a circumferential wall designed as an elastic spring element, whereby the chambers are separated from one another by a partition which is at least partly elastic and exhibits slits for an exchange of fluids.

Such elastic bearings are used to mount drive aggregates in vehicles of all types. For the mounting of combustion engines in motor vehicles, it is necessary on one hand, to prevent noise transmission, to have a bearing which is as soft as possible with a low self-damping which, however, allows the motor movements excited by the road to become very large and then slowly almost die out. On the other hand, large motor movements can be reduced by hard mountings or separate vibration dampings, but that again leads to significant noise transmission to the body.

2. Description of the Prior Art

The prior art includes elastic bearings of this type, for example EP-OS No. 98 331, DE-OS No. 32 25 701, and DE-OS No. 35 01 628, where in the vicinity of the partition, there is an elastic portion, and in this elastic region, there are slits for an exchange of fluids between the chambers. The slits are made by a cut in the elastic portion, and at a specified pressure, depending on the direction of the pressure, they open up a corresponding cross section. The slit can thereby be designed as the damping cross section itself or can be a bypass parallel to a damping passage.

OBJECT OF THE INVENTION

The object of the invention is to configure a slit in an elastic membrane so that when there is a flow against the membrane from different chambers at the same pressure, a different pressure reduction is possible.

SUMMARY OF THE INVENTION

This object is achieved by the invention in that the elastic partition is asymmetrical in cross section with respect to its central plane, at least in the vicinity of the slits, so that the opposite surfaces of the elastic partition in the vicinity of a slit are at different distances from the center plane.

It is advantageous that, on account of the geometry of the membrane and of the slits with the same pressure acting from different chambers, opening cross sections of different sizes of the slits are formed. Such a slit can be a throttle or a bypass parallel to a conventional throttle passage. On account of the asymmetrical configuration of the elastic partition in the vicinity of the slits, different flow cross sections are opened in the decompression and compression direction, so that it is possible to achieve different damping gradients.

If the elastic membrane according to the invention is used in a bypass parallel to a damping passage, then different flow cross sections are opened by the elastic membrane in the compression and decompression direction. This produces a different degree of action of the bypass in the two directions. To effectively limit the cavitation which occurs only in the decompression direction, sufficiently large flow cross sections must be opened. In general, this leads to a reduced damping, which is frequently undesirable, particularly in the compression direction.

The elastic partition according to the invention advantageously makes it possible to open different flow cross sections in the two directions, so that the cavitation can be effectively limited, and the reduction of the damping can simultaneously be kept low.

According to another important characteristic, the slit is inclined toward a surface.

In one configuration of the invention, the surfaces of the elastic partition run parallel to one another, whereby at least one surface in the vicinity of at least one slit is diagonal, concave or convex.

In one advantageous configuration of the invention, at least one surface runs diagonally, conically, spherically, concavely or convexly over its entire area.

Another aspect of the invention resides broadly in a hydraulically damping elastic bearing for providing an axial damping action, including: a housing; a partition that is mounted within the housing, so as to divide the interior of the housing into first and second chambers; the first partition including: an outer annular substantially rigid partition member and a central elastic partition member which is symmetrical in cross section, at least in the area of the slit, with respect to its central plane, such that the opposing surfaces if the central elastic partition member is disposed at substantially unequal distances from the central plane in the area of the slit.

We now turn to a detailed description of the preferred embodiments of the invention, after first briefly describing the drawings.

BRIEF DESCRIPTION OF THE DRAWINGS

FIGS. 3 to 14 show various embodiments of elastic partitions.

DESCRIPTION OF THE PREFERRED EMBODIMENTS

Figure 1:
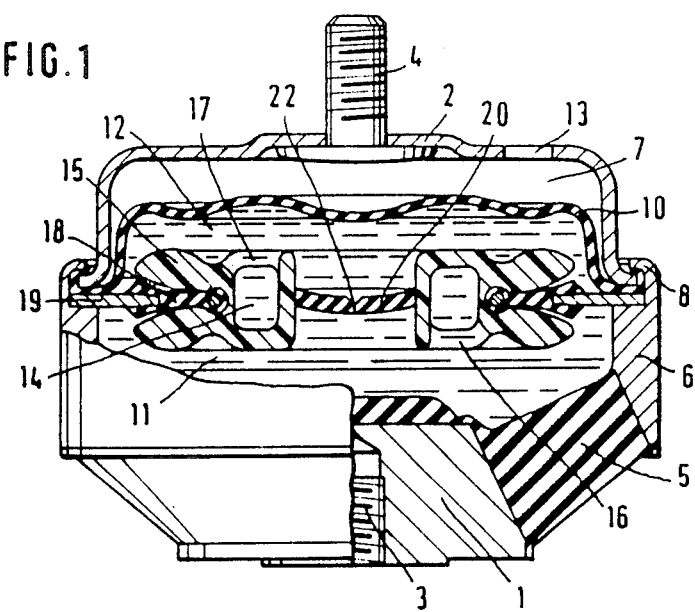
FIG. 1 shows an axial longitudinal section of a motor bearing with an elastic partition.

The motor bearing illustrated in FIG. 1 has two end walls 1 and 2 located opposite one another in the axial direction. The end wall 1 is equipped for fastening either with a threaded hole 3 or with a headless set screw (not shown). The end wall 2 designed as the cover plate has a corresponding headless fastening screw 4.

Vulcanized onto the conical jacket surface of the end wall 1 is a circumferential wall designed as an elastic spring element 5, which is joined at its connection surface away from the end wall 1 with a connecting flange 6. The connecting flange 6 also comprises a flange 8, which holds a membrane 18, a bellows 10 and the end wall 2 designed as a cover plate. The motor bearing, therefore, has two chambers 11 and 12 holding damping fluid and separated from one another by the membrane 18 and the rigid partition 15. The chamber 11 is designed as the pressure chamber and the chamber 12 is designed as the unpressurized compensation chamber, the volume of which can expand and contract. In the end wall 2 there is a ventilation opening 13, which ventilates the space 7 located between the end wall 2 and the bellows 10.

The membrane 18 is thereby designed so that, together with the rigid partition 15, it can execute axial movements during operation of the bearing, whereby the possible smooth axial movements of the membrane 18 correspond to relatively small amplitudes of the high-frequency noise oscillations, among other things, acting on the bearing. These latter oscillations are decoupled by the bearing so that there is a good noise isolation.

The rigid partition 15 contains in a radial plane an annular passage 14 running around the central bearing axis and connecting the two chambers 11 and 12 with one another. The annular passage 14 has a length and cross section surface such that the resonance frequency of the fluid mass displaced in the annular passage 14 during the damping activity of the bearing, in cooperation with the elasticities of the elastic spring element 5 and of the flexible membrane 18, essentially equal the resonance frequency of the vehicle motor on its suspension.

The membrane 18, rigidly clamped on its outside circumference, is connected at its clamp points with the rigid partition 15. In the rigid partition 15 there is an annular passage 14, whereby the inlet and outlet openings 16 and 17, respectively, each lead to one end surface of the partition 15. The outside circumference of the membrane 18 is in a sealed connection with a clamping ring 19. The clamping ring 19 for its part is clamped between the chambers 11 and 12, together with the bellows 10 and the cover plate 2 in the flange 8.

In the central area of the rigid partition 15, there is an elastic partition 20, which exhibits at least one slit 22 as a bypass. When there are extreme underpressures or pressure peaks in the compression stage, the slit opens the bypass.

Figure 2:
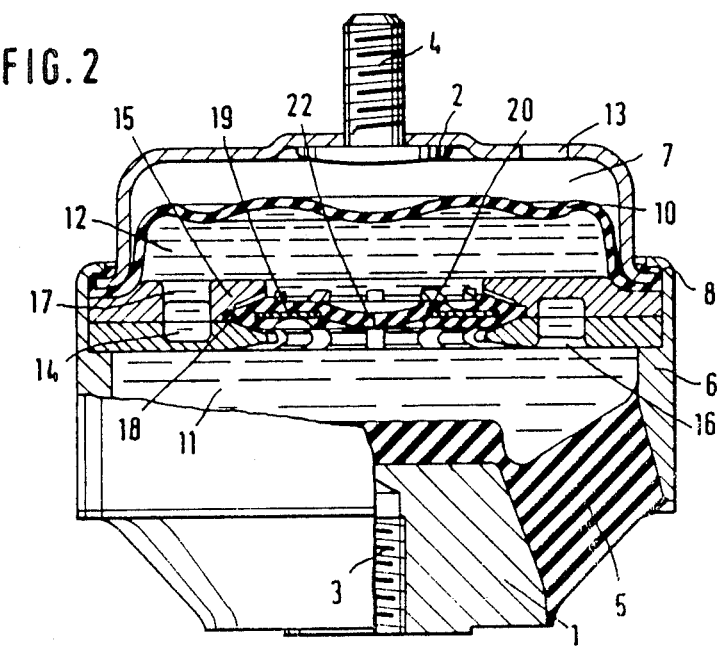
FIG. 2 shows a motor bearing with an elastic partition, surrounded by a damping passage enclosed externally in a rigid portion.

The bearing illustrated in FIG. 2 is analogous in principle to the bearing illustrated in FIG. 1, with the distinction that the rigid partition is held rigid and axially immobile in the outside radial area of the bearing. The rigid partition 15 thereby also has an annular passage 14. In the central area of the rigid partition 15, there is an elastic partition 20, whereby the slits 22 cause a pressure decrease, depending on the pressure, parallel to the passage 14.

Individual embodiments of the elastic partition 20 are illustrated in FIGS. 3 to 7. The embodiment illustrated in FIG. 3 has a slit 22 in the form of a cut in the shape of a cross. The slit 22 in FIG. 4 has a cut in the shape of an H. In FIG. 5, the slit 22 is comprised in three cuts emanating in a star shape from the center. FIG. 6 has two cuts running in a semi-circular shape, and FIG. 7 has a semi-circular or arc-shaped cut. All these slits 22 illustrated in FIGS. 3 to 7 act as a joint valve both in the compression and in the decompression stage. On account of the inclined areas 9, the elastic partition 20 has an asymmetrical shape, so that the opposite surfaces 23 and 24, as shown in FIGS. 8 and 9, are at different distances from the center plane 21. This configuration means that with the same pressure exerted on the different surfaces 23 and 24, there can be a different opening cross section of the slit 2.

FIGS. 10 to 12 show different surface shapes of the elastic partition 20. FIG. 10 shows a surface 23 parallel to the center plane 21, while the surface 24 is convex. In FIG. 11 the surface 23 is concave and the surface 24 convex. FIG. 12 shows parallel surfaces 23 and 24, whereby the slit 22 exhibits inclined areas 9. One feature all the elastic partitions 22 have in common is that when there is pressure on the surface closer to the center plane 21, there is a larger opening cross section on the surface farther away from the center plane 21. Where there is pressure on the opposite surface, the elastic partition 20 operates in reverse.

FIGS. 13 and 14 show other variations. In FIG. 13 there are several slits 22, and in FIG. 14 there is a slit which runs in a spiral shape, all of which are provided with inclined areas 9.

The invention as described hereinabove in the context of the preferred embodiments is not to be taken as limited to all of the provided details thereof, since modifications and variations thereof may be made without departing from the spirit and scope of the invention.

What is claimed is:

1. A hydraulically damping elastic bearing for providing an axial damping action, comprising:
    a housing;
    a partition being at least partially elastic and being mounted within said housing so as to divide the interior of said housing into first and second chambers, and at least one slit provided in said partition;
    said partition comprising:
    an outer annular substantially rigid partition member; and
    a central elastic partition member provided with said slit;
    said central elastic partition member being asymmetrical in cross section, at least in the area of said slit, with respect to its central plane such that the opposing surfaces of said central elastic partition member are disposed at substantially unequal distances from said central plane in the area of said slit.

2. The bearing according to claim 1, wherein said partition further comprises a flexible membrane attached to the outer periphery of said outer annular rigid partition member.

3. The bearing according to claim 2, further comprising resonance tuned damping means for damping a resonance produced by a motor.

4. The bearing according to claim 3, wherein said resonance tuned damping means comprises an annular passage formed in said outer annular substantially rigid partition member and interconnecting said first and second chambers.

5. The bearing according to claim 2, wherein said slit is provided with an opening having an inclined surface, said inclined surface being inclined with respect to one of said opposing surfaces of said partition.

6. The bearing according to claim 2, wherein said opposing surfaces of said central elastic partition member are disposed substantially parallel to one another and wherein at least one of said opposing surfaces is chosen from a configuration, chosen from the group consisting essentially of inclined, concave or convex, in the area of said slit.

7. The bearing according to claim 2, wherein at least one of said opposing surfaces of said central elastic partition member is chosen from a configuration, chosen from the group consisting essentially of spherical, concave or convex over substantially its entire area.

8. The bearing according to claim 1, further comprising resonance tuned damping means for damping a resonance produced by a motor.

9. The bearing according to claim 8, wherein said resonance tuned damping means comprises an annular passage formed in said partition and interconnecting said first and second chambers.

10. The bearing according to claim 1, further comprising resonance tuned damping means for damping a resonance produced by a motor.

11. The bearing according to claim 10, wherein said resonance tuned damping means comprises an annular passage formed in said outer annular substantially rigid partition member and interconnecting said first and second chambers.

12. The bearing according to claim 1, wherein said slit is provided with an opening having an inclined surface, said inclined surface being inclined with respect to one of said opposing surfaces of said partition.

13. The bearing according to claim 1, wherein said slit is provided with an opening having an inclined surface, said inclined surface being inclined with respect to one of said opposing surfaces of said partition.

14. The bearing according to claim 1, wherein said opposing surfaces of said partition are disposed substantially parallel to one another and wherein at least one of said opposing surfaces is chosen from a configuration, chosen from the group consisting essentially of inclined, concave or convex, in the area of said slit.

15. The bearing according to claim 1, wherein said opposing surfaces of said central elastic partition member are disposed substantially parallel to one another and wherein at least one of said opposing surfaces is chosen from a configuration, chosen from the group consisting essentially of inclines, concave or convex, in the area of said slit.

16. The bearing according to claim 1, wherein at least one of said opposing surfaces of said central elastic partition member is chosen from a configuration, chosen from the group consisting essentially of spherical, concave or convex over substantially its entire area.

17. A hydraulically damping elastic bearing for providing an axial damping action, said bearing comprising:
 a housing;
 a partition mounted within said housing so as to divide the interior of said housing into first and second chambers, said partition being at least partially elastic and comprising:
 an outer annular elastic membrane;
 an inner annular substantially rigid partition member, said inner annular substantially rigid partition member being provided with an annular passage formed therein and interconnecting said first and second chambers; and
 a central elastic partition member provided with at least one slit, said central elastic partition member being asymmetrical in cross section, at least in the area of said slit, with respect to its central plane such that the opposing surfaces of said central elastic partition member are disposed at substantially unequal distances from said central plane in the area of said slit;
 at least one of said first and second chambers being provided with a circumferential elastic spring member.

18. A hydraulically damping elastic bearing for providing an axial damping action, said bearing comprising:
 a housing:
 a partition mounted within said housing so as to divide the interior of said housing into first and second chambers, said partition being at least partially elastic, said partition comprising:
 an outer annular substantially rigid partition member, said outer annular substantially rigid partition member being provided with an annular passage formed therein and interconnecting said first and second chambers: and
 a central elastic partition member provided with at least one slit, said central elastic partition member being asymmetrical in cross section, at least in the area of said slit, with respect to its central plane such that the opposing surfaces of said central elastic partition member are disposed in substantially unequal distances from said central plane in the area of said slit;
 at least one of said first and second chambers being provided with a circumferential elastic spring member.

* * * * *